Oct. 19, 1943. E. C. TORONTO 2,332,030
MEDICINE MIXING AND DISPENSING DEVICE
Filed March 25, 1941 2 Sheets-Sheet 2

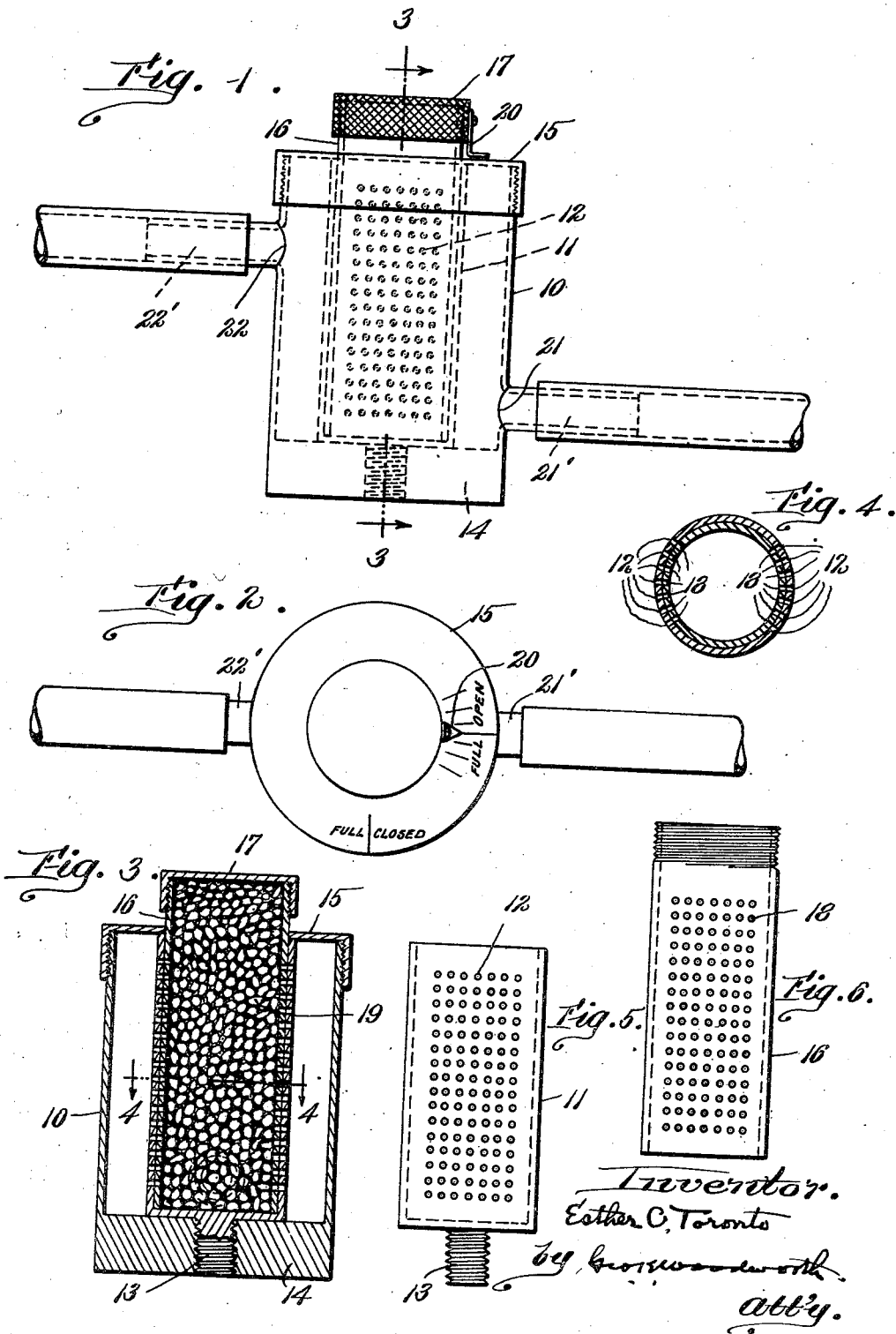

Inventor.
Esther C. Toronto
by Frank K. Woodworth
Atty.

Patented Oct. 19, 1943

2,332,030

UNITED STATES PATENT OFFICE 2,332,030

MEDICINE MIXING AND DISPENSING DEVICE

Esther C. Toronto, Boston, Mass.

Application March 25, 1941, Serial No. 385,211

4 Claims. (Cl. 299—83)

The object of this invention is to provide a device that may be manufactured economically and is simple in operation, whereby soluble material, such as medicinal preparations, may be dissolved in a flowing stream of liquid, such as water, to form solutions of different concentrations to be dispensed for the purpose desired; or the stream of liquid may pass through the device without entering the receptacle containing the soluble matter.

With this object in view, my invention comprises the parts, combinations and arrangements of parts, hereinafter more fully described and then particularly pointed out in the appended claims.

In the drawings,

Figure 1 is an elevation of a medicine mixing and dispensing device embodying my invention.

Fig. 2 is a plan view of the same.

Fig. 3 is a central vertical section taken on the line 3—3 of Fig. 1.

Fig. 4 is a horizontal section taken on the line 4—4 of Fig. 3.

Fig. 5 is an elevation of the cylindrical casing hereinafter described.

Fig. 6 is an elevation of the cylindrical member enclosed within and rotatable with respect to said casing.

Figure 7:
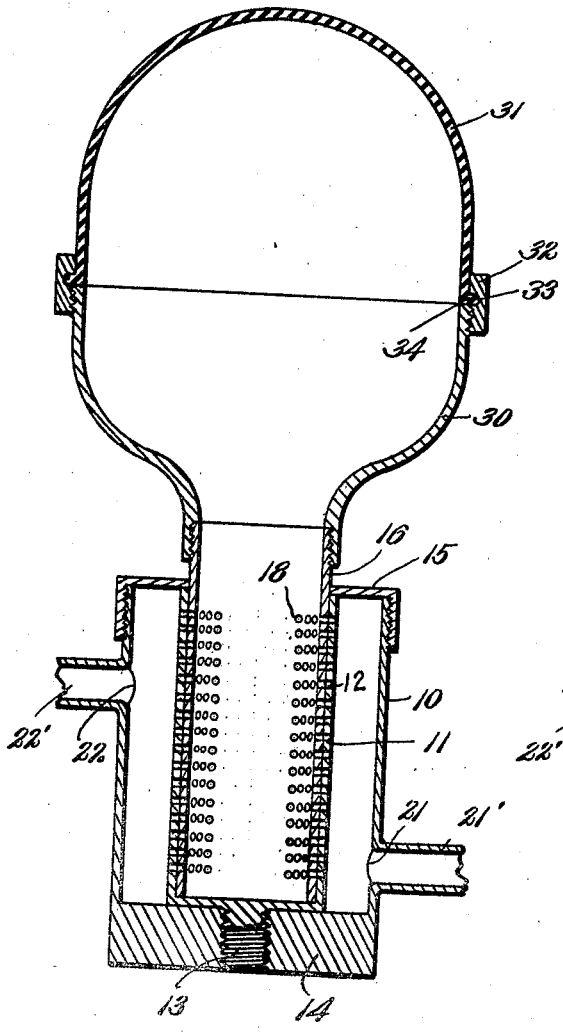
Fig. 7 is a central vertical section of a modified form of construction.

In the particular drawings selected for more fully disclosing my invention, 10 is a vessel of any suitable material, such as metal or a plastic composition that is not affected by the medicinal or other material employed, and herein shown as cylindrical. Within said vessel is a perforated cylindrical casing 11, provided with apertures 12, which may extend around the periphery of said casing, or may be arranged in two oppositely disposed groups, as shown in Fig. 4.

The lower end of the casing is closed, and by any suitable means, such as the stud 13, shown as integral with the bottom thereof, said casing, which preferably is spaced away from the wall of the vessel 10, may be rigidly secured to the base 14 of the vessel. By means of the flanged cap 15, shown as in threaded engagement with the upper end of the vessel and abutting the upper end of the cylindrical casing, the vessel may be closed with a fluid-tight joint. Disposed within said fixed casing is a perforated open-ended cylindrical member 16 which closely fits the cylindrical casing and is rotatable therewith, the lower end of said cylindrical member abutting the bottom of the casing and the upper end thereof extending beyond the upper end of said casing and projecting through the central aperture with which said cap is provided. The upper end of the member 16 may be closed in any suitable manner, as by the flanged cap 17, herein shown as in threaded engagement with the upper end thereof, said cap, if used, preferably being knurled for convenience in rotatably moving the member 16 with respect to the casing 11, in order to vary the degree of registration of the perforations 18 therein and the perforations 12 of the enclosing casing 11.

As indicated in Fig. 2, the upper surface of the cap 15 may be graduated to indicate the degree of co-operation between the perforations in the two cylindrical members and thereby the strength of the solution formed by dissolving the material enclosed within the rotatable cylindrical member 19. Obviously, the rotation of the cylinder 16 through a very small arc will bring the two sets of perforations completely out of register, if they are accurately spaced in the two cylinders, but, to compensate for possible inaccuracies, a mark "Full-closed" is placed on the upper surface of the cap 15 to indicate that a perforated quadrant (in the present instance) of the inner cylinder is opposite an imperforate quadrant of the outer cylinder, it being obvious that when the parts are in this adjustment, there can be no possibility of liquid flow through the soluble material.

Any convenient means, such as the pointer 20, attached to the cap 17, may be employed to indicate the position of the perforations in the wall of the inner cylinder with respect to those of the outer.

The vessel is provided with inlet and outlet ports 21, 22, preferably located in different horizontal planes and preferably oppositely disposed, said ports being provided, in the present instance, with extensions 21', 22', respectively, for receiving rubber tubing, or the like, whereby the inlet port may be connected to the source of the liquid in which the soluble matter is to be dissolved, for example, a hot and cold water mixing faucet, and the outlet port connected to the point where the solution is to be used, for example, a receptacle in which an injured hand, or other member, is to be treated.

In hospital work, the inner cylinder that contains the substance 19 is first rotated so that the two sets of perforations are completely out of register and then the temperature of the water flowing through the vessel is regulated to suit the treatment to be given the patient, whereupon the inner cylinder is given such partial rotation as will give the concentration of the solution required for such treatment. The spacing of the graduation marks on the face of the cap 15 can readily be determined experimentally and will depend, among other things, upon the total effective area of the inlet and outlet ports to and from the inner cylinder afforded by the degree of co-operation or registration of the perforations of the two relatively movable cylinders.

For treatments of greater length than could be made with the material contained in the inner cylinder 16, there may be substituted for the cap or closure member 17, another form of removable closure consisting of a receptacle 30, shown in the present instance as in threaded engagement with the upper end of the cylindrical member 16 (Fig. 7), the cubical contents of said receptacle being at least comparable to, or preferably greater than, that of said member.

To prevent the possible caking of the soluble material in said receptacle due to the flow of water thereinto, and the clogging of the outlet thereof, means must be employed to exert a counteracting pressure on the upper surface of the material in the receptacle, and in the embodiment of my invention shown in Fig. 7, such means consists of a resilient bulb 31, coupled to the upper end of the receptacle by the ring 32, which is threaded to the upper end of said receptacle and provided with a groove 33 for receiving the rib 34 formed on the lower edge of the bulb.

Figure 8:
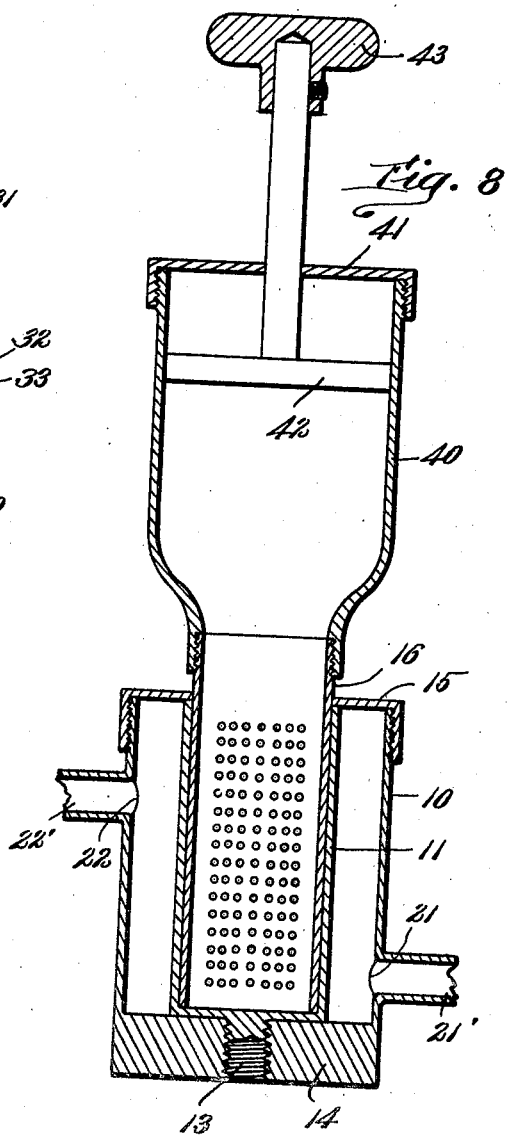
Fig. 8 is a similar section of a further modification.

Obviously, the same result can be effected by the construction shown in Fig. 8, in which the removable closure of the cylindrical member 16 consists of the tubular extension 40, the lower end of which is threaded to the upper end of said cylindrical member and which is provided with an apertured and flanged cap 41 threaded to the upper end thereof. Within said extension member 40 is disposed a piston 42, the stem of which projects through the aperture in the cap 41, and is provided at its upper end with a knob 43.

Should the outlet of the receptacle 30, or tubular extension 40, become clogged, due to the caking of the material therein, it will be obvious that the pressure exerted on such material by squeezing the bulb 31, or forcing down the piston 42, will drive the same downwardly into the cylindrical member 16.

In all the embodiments of my invention where the apertures or perforations in the walls of the cylindrical casing 11 and cylindrical member 16 do not extend entirely around the respective peripheries thereof, it is preferable that the perforated portions of said cylindrical casing 11 be oppositely disposed and in alignment with the inlet and outlet ports 21 and 22 of the vessel 10, in order to facilitate the flow of liquid through the two concentric perforated cylinders.

Having thus described illustrative embodiments of my invention without, however, limiting the same thereto, what I claim and desire to secure by Letters Patent is:

1. A device of the character described, comprising a vessel provided with oppositely disposed inlet and outlet ports located in different horizontal planes, a perforated cylindrical casing centrally disposed in said vessel in spaced relation with the interior wall thereof, said casing being closed at its lower end, means rigidly securing said casing to the base of said vessel, a flanged cap in threaded engagement with the upper end of said vessel and abutting the upper end of said cylindrical casing, said cap having a central aperture, a perforated open-ended cylindrical member rotatably disposed within and closely fitting said casing, the lower end of said cylindrical member abutting the bottom of said casing and the upper end thereof extending beyond the upper end of said casing and projecting through the aperture in said cap, and means engaging the upper end of said cylindrical member for closing and for rotating said member with respect to said casing to vary the degree of registration of the perforations in said casing and said member.

2. A device of the character described, comprising a vessel having inlet and outlet ports, a perforated cylindrical casing centrally disposed in said vessel in spaced relation with the interior wall thereof, said casing being closed at its lower end, means rigidly securing said casing to the base of said vessel, a flanged cap in threaded engagement with the upper end of said vessel, said cap having a central aperture, a perforated open-ended cylindrical member rotatably disposed within and closely fitting said casing, the lower end of said cylindrical member abutting the bottom of said casing and the upper end thereof extending beyond the upper end of said casing and projecting through the aperture in said cap, and a removable closure for said cylindrical member whereby the degree of co-operation of the perforations in said casing and said member may be varied.

3. A device of the character described, comprising in combination a vessel having inlet and outlet ports, two perforated concentric cylindrical members centrally disposed in said vessel, the cylindrical wall of the outer member being spaced away from the wall of said vessel and the inner cylindrical member being mounted for rotation within and closely fitting the outer of said members, the upper end thereof extending beyond the upper end of the outer member, means rigidly securing said outer member to the base of said vessel, a removable closure for the inner cylindrical member comprising a receptacle removably secured to the upper end thereof, and a resilient closure for said receptacle.

4. A device of the character described, comprising in combination a vessel having inlet and outlet ports, two perforated concentric cylindrical members centrally disposed in said vessel, the cylindrical wall of the outer member being spaced away from the wall of said vessel and the inner cylindrical member being mounted for rotation within and closely fitting the outer of said members, the upper end thereof extending beyond the upper end of the outer member, means rigidly securing said outer member to the base of said vessel, a removable closure for the inner cylindrical member comprising a receptacle removably secured to the upper end thereof, and means for exerting pressure on the upper surface of material enclosed within said receptacle.

ESTHER C. TORONTO.